United States Patent Office 3,701,780
Patented Oct. 31, 1972

3,701,780
IMIDAZO[1,2-a]PYRIDINES
Michael H. Fisher, Somerville, N.J., assignor to
Merck & Co., Inc., Rahway, N.J.
No Drawing. Filed Sept. 18, 1970, Ser. No. 73,603
Int. Cl. C07d 31/50
U.S. Cl. 260—294.8 C                               5 Claims

ABSTRACT OF THE DISCLOSURE

New imidazo[1,2-a]pyridines substituted at the 2 and 6 positions as well as processes for preparing such compounds are disclosed. Also disclosed are methods of using the above compounds for the treatment of helmintic and fungal infections as well as compositions containing the above compounds as an active ingredient for use as anthelmintic and fungicidal agents.

SUMMARY OF THE INVENTION

This invention relates to new and useful compositions of matter classifiable in the field of organic chemistry as imidazo[1,2-a]pyridines. More particularly, this invention relates to imidazo[1,2-a]pyridines substituted at the 2 and 2,6 positions; to processes for preparing such compounds; to methods for employing such compounds as anthelmintic agents and as fungicides; and to anthelmintic and fungicidal compositions containing such compounds as the essential active ingredient.

In one of its use aspects, therefore, the instant invention may be described as residing in the concept of a method for the treatment and control of helmintic infestations in domestic animals which comprises administering to said animal a combination of an inert, pharmaceutically acceptable carrier, and an anthelmintically effective quantity of an imidazo[1,2-a]pyridine of the formula:

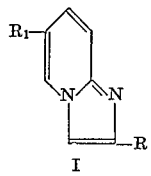

I wherein R is a five or six membered monocyclic heteroaromatic ring containing from 1 to 3 hetero atoms selected from the group consisting of oxygen, nitrogen and sulfur; 3 - oxothiazol - 4 - yl, 3 - oxothiazol - 2 - yl, napthyl, fluoronapthyl, cyano, amino, phenyl and substituted phenyl, such as halophenyl and biphenylyl; and

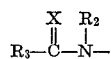

wherein X is oxygen or sulfur; $R_2$ is hydrogen or loweralkyl; $R_3$ is hydrogen, loweralkyl having from 1 to 8 carbon atoms, cycloalkyl, aryl, aralkyl, heteroaryl, monoloweralkylamino, diloweralkylamino, cycloalkylamino, loweralkoxy, loweralkylthio, aryloxy, arylthio, heteroaryloxy, or heteroarylthio; and $R_1$ is hydrogen, loweralkyl, loweralkoxy, loweralkylthio, phenyl, naphthyl, phenoxy, naphthyloxy, nitro, amino, and

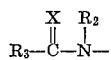

wherein X, $R_2$ and $R_3$ are as defined above.

Specific examples of the heteroaromatic substituents represented by R in Formula I are five-membered rings containing nitrogen, sulfur or oxygen as the sole hetero atom, i.e. furyl, thienyl, pyrazolyl, imidazolyl and pyrryl; five-membered rings containing nitrogen and sulfur such as thiazolyl, thiadiazolyl and isothiazolyl, 5-membered rings containing nitrogen and sulfur such as thiazolyl, thiadiazolyl and isothiazolyl; 5-membered rings containing nitrogen and oxygen such as oxazolyl, six membered rings containing nitrogen such as pyridyl, pyrimidinyl, or pyrazinyl; and six membered rings containing nitrogen and sulfur such as thiazinyl and thiadiazinyl. The nitrogen and sulfur containing heterocycles are preferred with 4'-thiazolyl and 2'-thiazolyl being particularly desirable.

The terms, loweralkyl, loweralkoxy and loweralkylthio, as used above are intended to include straight or branched chain saturated or unsaturated alkyl, haloalkyl, alkoxy, haloalkoxy, alkylthio and haloalkylthio groups having, unless otherwise specified, from 1 to 8 carbon atoms in the alkyl moiety such as, for example methyl, dichloromethyl, ethyl, isopropyl, allyl, t-butyl, amyl, octyl, methoxy, ethoxy, isopropoxy, allyloxy, propenyloxy, 2,2,2-trifluoroethoxy, amyloxy, n-octyloxy, methylthio, ethylthio, 2-chloroethylthio, isopropylthio, allylthio, n-hexylthio, and the like. The term, cycloalkyl, is intended to include cycloalkyl radicals having from 3 to 10 carbon atoms such as, for example, cyclopropyl, cyclopentyl, cyclohexyl, adamantyl, and the like. The terms, aryl, aryloxy and arylthio, are intended to include aryl, aryloxy and arylthio groups having from 6 to 12 carbon atoms such as, for example, phenyl, tolyl, napthyl, phenoxy, halophenoxy, aminophenoxy, tolyloxy, napthloxy, phenylthio, halophenylthio, aminophenylthio, tolylthio, napthylthio, and the like. By the term, aralkyl, applicants intend to include aralkyl groups such as, for example benzyl, halobenzyl, phenethyl and the like. The terms, heteroaryl, heteroaryloxy and heteroarylthio, are intended to include radicals such as, for example, furyl, thiaozlyl, thienyl, pyridyl, furyloxy, thiazolyloxy, thienyloxy, pyrazinyloxy, furylthio, thiazolylthio, thienylthio, pyrazinylthio, and the like. The terms, monoloweralkylamino and diloweralkylamino, are intended to include straight or branched chain mono- or diloweralkylamino radicals having from 1 to 8 carbon atoms in the alkyl moiety such as, for example, methylamino, diethylamino, isopropylamino, methylethylamino, n-hexylamino, and the like; and the term cycloalkylamino is intended to include radicals such as, for example, piperazino, piperidino, morpholino, pyrrolidino, and the like.

When the symbol $R_3$ in Formula I represents a loweralkoxy, loweralkylthio, aryloxy arylthio, heteroaryloxy or heteroarylthio group, the substituent at the 2 or 2,6 positions on the imidazopyridine is of the carbamate or thionocarbamate type depending upon the nature of the X substituent. Where the symbol $R_3$ represents hydrogen, loweralkyl, cycloalkyl, aryl, aralkyl, heteroaryl, monoloweralkylamino, diloweralkylamino or cycloalkylamino, the substituent on the 2 or 2,6 positions of the imidazopyridine is of the carbonylamino or thiocarbonylamino type again depending on the nature of the X substituent.

In another of its use aspects, the instant invention may be described as residing in the concept of a method of killing and controlling the growth of fungi which comprises contacting the area upon which fungus growth is to be controlled with a fungicidally effective quantity of an imidazo[1,2-a]pyridine of Formula I, above, wherein R and $R_1$ are as previously defined.

PREFERRED EMBODIMENTS OF THE INVENTION

The preferred embodiments of the invention are realized when the substitution at the 2-position is selected from the group of substituents consisting of 5-membered monocyclic heteroaromatic rings containing nitrogen and sulfur heteroatoms; and loweralkoxycarbonylamino; and the substituent at the 6-position is loweralkoxycarbonylamino. Especially preferred are the groups 4-thiazolyl and ethoxycarbonylamino at the 2-position and ethoxycarboxylamino at the 6-position. Exemplary compounds are:

6-ethoxycarbonylamino-2-(4-thiazolyl)-imidazo[1,2-a] pyridine;
2,6-bis-(ethoxycarbonylamino)-imidazo[1,2-a]pyridine;
6-ethoxycarbonylamino-2-(2-thiazolyl)-imidazo[1,2-a] pyridine; and
6-ethoxycarbonylamino-2-methoxycarbonylamino-imidazo[1,2-a]pyridine;
6-methoxycarbonylamino-2-(4-thiazolyl)-imidazo[1,2-a] pyridine;
6-isopropoxycarbonylamino-2-(4-thiazolyl)-imidazo [1,2-a]pyridine.

In its composition aspect, the instant invention may be described as residing in the concept of novel compositions of matter comprising anthelmintic and antifungal formulations containing as the essential active ingredient an imidazo[1,2-a]pyridine of Formula I, above, wherein R and $R_1$ are as previously defined.

Although certain of the imidazo[1,2-a]pyridines disclosed in Formula I are known compounds, the vast majority of the imidazo[1,2-a]pyridines disclosed in Formula I are new compositions of matter never having been disclosed in the chemical literature. Accordingly, in its product aspect, the instant invention may be described as residing in the concept of a new class of chemical compounds characterized in terms of chemical structure as imidazo[1,2-a]pyridines of Formula I, above, where R and $R_1$ are as previously defined provided that $R_1$ cannot be hydrogen where R is furyl, thienyl, napthyl, or phenyl.

The instant invention is based upon applicants' discovery that the imidazo[1,2-a]pyridines of Formula I display applied inherent use characteristics as anthelmintic and fungicidal agents as confirmed by standard in vitro and in vivo techniques. It is contemplated that dosage units of pharmaceutical formulations containing these imidazo[1,2-a]pyridines as the essential active ingredient will be administered, either orally or by injection, to domestic animals in the treatment and control of helminthiasis and that antifungal quantities of the said imidazo[1,2-a]pyridines will be applied, either directly or in the form of fungicidal formulations, onto, or by incorporation into, substrates wherein it is desired to kill or control the growth of fungi.

In one of its process aspects, the instant invention may be described by the following flow chart:

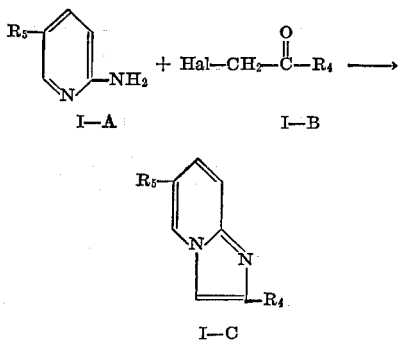

wherein $R_4$ is a five membered monocyclic heteroaromatic ring containing from 1 to 3 hetero atoms selected from the group consisting of oxygen, nitrogen and sulfur; 3-oxothiazol-4-yl, 3-oxothiazol-2-yl, napthyl, halonapthyl, phenyl, or halophenyl; $R_5$ is hydrogen, loweralkyl, loweralkoxy, loweralkylthio, phenyl, napthyl, phenoxy, napthyloxy, nitro and amino; and Hal is a halogen. The reaction is run by combining approximately equimolar quantities of the 2-amino 5-substituted pyridine (compound I-A) and the halogenated acetyl compound (compound I-B) in a suitable solvent. Solvents of choice are organic polar and non-polar solvents in which each of the starting compounds are soluble at the temperature at which the reaction is run. Preferred solvents are selected from lower ketones, loweralkanols, lower halogenated hydrocarbons, and aromatic hydrocarbons examples of which are acetone, methyl ethyl ketone, methanol, ethanol, methylene chloride, chloroform, benzene, toluene and the like. The reaction is generally run at a temperature of from 10° C. to the reflux temperature of the solvent being employed, however, it has been found that temperatures of from room temperature to 60° C. are usually sufficient to allow the reaction to proceed to completion. The duration of the reaction is from ½ to 10 hours, the duration being inversely dependent upon the temperature at which the reaction is run, higher temperatures requiring shorter reaction times. The product initially isolated, and which usually spontaneously precipitates from the organic solvent, is the hydrohalide salt. This can be dissolved in water and basified to at least pH 9 and extracted with a non-polar water immiscible organic solvent. Isolation is accomplished by utilizing standard laboratory techniques such as evaporation of solvents and recrystallization, usually organic solvents being preferred of either the polar or non-polar types for the latter process.

Not all possible combinations of $R_4$ and $R_5$ are prepared directly by the process of Reaction Scheme I. Many of the compounds of this invention are prepared by converting the compound prepared directly by the process to another compound through various techniques of organic chemical synthesis.

When the compounds resulting from Reaction Scheme I have a group substituted at the 2-position ($R_4$) which is capable of having the oxidation state of one of its constituent atoms, preferably nitrogen, increased, and said compound is treated with a suitable oxidizing agent, an oxo-variant of compound I-C will be formed. The preferable substituents at the 2-position are thiazolyl, oxazolyl, and the like. Examples of some oxidized compounds formed are: 2-(3-oxothiazol-2-yl)imidazo[1,2-a]pyridine; 2-(3-oxo-thiazol-4-yl) - 6 - ethylimidazo[1,2-a]pyridine; and 2 - (3-oxo-oxazol-5-yl)-6-methylimidazo[1,2-a]pyridine. The agents useful for the oxidation are hydrogen peroxide and organic peracids such as peracetic acid, perbenzoic acid, m-chloroperbenzoic acid, trifluoro peracetic acid, and the like. The solvents are those normally used by those skilled in the art which are inert to oxidation; halogenated carboxylic acids such as trifluoroacetic acid have proven especially useful. The reaction is run at a temperature of from about room temperature to the reflux temperature of the solvent employed for a period of from 1 to 24 hours. The reaction time required is inversely proportional to the temperature, thus allowing shorter reaction times for higher temperatures.

Owing to the difficulty of forming some halo acetyl compounds (compound I-B) specifically the 2-(haloacetyl)thiazole, alternate reaction procedures have been utilized. Starting with readily available 6-($R_5$)-2-loweralkoxycarbonylimidazo[1,2-a]pyridine wherein $R_5$ is as previously defined and liquid ammonia in an optional non-reactive organic solvent such as a loweralkanol, in a sealed system at a temperature of from 50–100° C., there is formed a 2-carbamoyl derivative. The 6-($R_5$)-2-carbamoyl imidazo[1,2-a]pyridine can be converted to the cyano derivative by treating it with phosphorous oxychloride or similar oxidizing agent with or without a solvent, at a temperature ranging from room temperature to the reflux temperature of the reaction medium for a duration of from 5 minutes to 2 hours. 6-($R_5$)-2-cyanoimidazo[1,2-a]pyridine and substituted analogs thereof can be converted to the 6-($R_5$)-2-thiocarbamoyl imidazo-[1,2-a]pyridine by treating the cyano compound with hydrogen sulfide in a basic media such as pyridine and/or triethylamine in a non-reactive organic solvent. The reaction is run at room temperature and is complete in from 1 to 5 hours. The 6-($R_5$)-2-thiazolyl imidazo[1,2-a]pyridine is prepared by treating the above thiocarbamoyl derivative with a haloacetaldehyde in an inert organic solvent, such as a loweralkanol, at a temperature of the reaction medium, for a duration of from 1 to 10 hours.

When, in Reaction Scheme I, $R_4$ is amino, certain substituents may be affixed thereon according to the following reaction scheme:

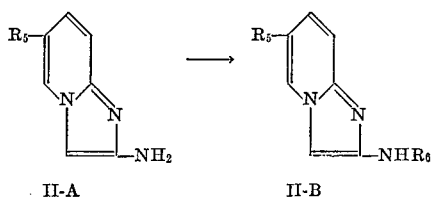

II-A          II-B wherein $R_5$ is as defined above and $R_6$

wherein $R_3$ and X are as previously defined. The reaction may be affected by treating the above amine starting material (compound II-A) with a compound having one of the following formulae:

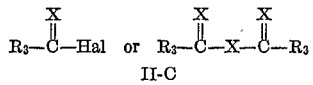

II-C wherein $R_3$, X and Hal are as previously defined. Such a reaction is affected when employing the first compound of II-C by combining the two compounds in an inert organic solvent in the presence of a base capable of combining with and isolating from reaction, the liberated H-Hal. The solvents of choice are those that will not react with the halogenated compound, such as aromatic hydrocarbons, halogenated hydrocarbons and the like. Benzene, toluene, chloroform, and carbontetrachloride are exemplary. The bases must be capable of absorbing the H-Hal liberated in the reaction, however, they must not react with compound II-C. Tertiary organic amines have been found to be of preference, however, inorganic bases such as alkali metal or alkaline earth metal hydroxides, carbonates and bicarbonates have proved useful. In such cases in which the latter group of bases is employed, the reaction is a two phase one wherein the inorganic base is not appreciably soluble in the organic solvent. The tertiary organic amine bases which have proven superior are pyridine, triethylamine, trimethylamine, and the like. The base is required in a single molar amount however, superior results have been achieved when several molar excesses are available. One modification of exceptional merit is to use the tertiary organic amine in such excess as to render a separate solvent unnecessary. Generally, a 5 to 50 molar excess will suffice for such a condition to result. The reaction is run initially at a temperature substantially below room temperature in order that the vigor of the reaction be controlled. The temperature is preferably maintained at from 0° to 10° C. during the combination of the two reagents. Following the combination of the reagents the reaction is stirred at a temperature of from 20° C. to the reflux temperature of the reaction medium with from room temperature to 50° C. being preferred. In general, from ½ to 10 hours is required for the completion of the reaction. Isolation of the product is effected by standard laboratory techniques known to those skilled in the art.

When the second compound of II-C is employed the use of a base is obviated since there is no H-Hal liberated during the course of the reaction. The anhydride is used either in solution in one of the reaction solvents discussed above or in such excess, if said anhydride is available in larger quantities, as to render a solvent unnecessary. The reaction conditions are the same as those discussed for the halogen compound above, and the product is isolated by standard laboratory techniques.

When $R_5$ is defined as being amino in Reaction Scheme II the possibility of substitution on both amine groups is present. In this case two moles of the acylating reagent II-C are required and there is formed a compound having the formula:

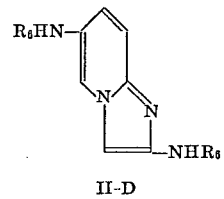

II-D wherein $R_6$ is as defined previously. When such a result is not desired, compound II-A must be prepared in which the amino group is suitably protected. Suitable protecting groups having been found to be acyl groups such as acetyl, propionyl, and the like. This protection must be effected starting with compound II-A, the 6-substituted 2-amino pyridine. Subsequent to the ring closure (Reaction Scheme I), and the acylation step (Reaction Scheme II), the protecting group may be removed and the desired compound thus isolated.

The above reaction may be analogously performed on compound I-C wherein $R_5$ is amino and $R_4$ is other than amino as in the following reaction scheme:

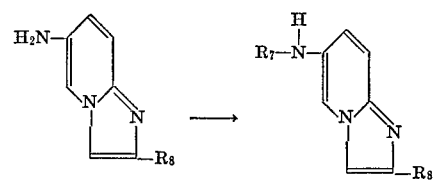

wherein $R_8$ is a 5-membered monocyclic heteroaromatic ring containing from 1 to 3 hetero atoms selected from the group consisting of oxygen, nitrogen and sulfur; 3-oxo-thiazol-4-yl, 3-oxothiazol-2-yl, naphthyl, halonaphthyl, phenyl and halophenyl; $R_7$ is

wherein X and $R_3$ are as previously defined.

The reaction on the amine at the 6-position of the imidazo[1,2-a]pyridine nucleus is the same as the reaction on the amine at the 2-position described in Reaction Scheme II with the only difference being the substituents at the non-reacting position. However, the difference in reaction sites has been found to have no effect on the reaction or reactivity of the amino group. The reaction conditions, reagents, solvent, and bases for Reaction Scheme II are applicable to Reaction Scheme III.

As an alternate procedure for obtaining compound I–C wherein $R_4$ is amino, the following procedure may be considered:

REACTION SCHEME IV

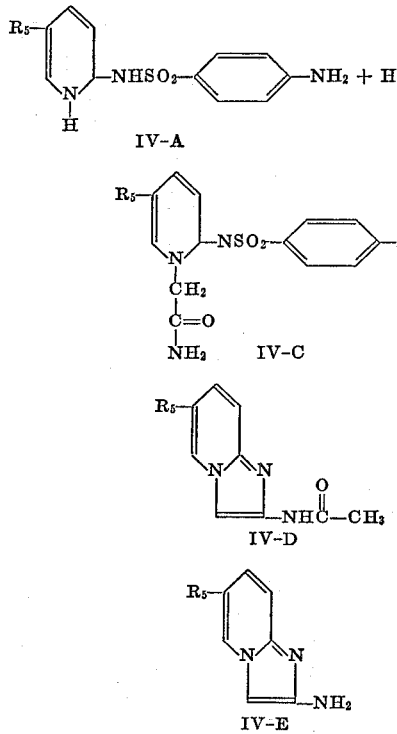

wherein $R_5$ and Hal are as previously defined.

The first step is performed by combining the halo acetamido compound (IV–B) with the 2-(p-amino-benzenesulfonamido)-5-substituted pyridine compound (IV–A) in solution in a solvent in which a strong base is present. The mixture is heated at from room temperature to the reflux temperature of the solvent with the latter temperature being preferred. The reaction is in general complete in from 1 to 5 hours at said temperature with lower temperature requiring longer reaction times. The solvents and bases of choice have been found to be water or loweralkanols in which is dissolved an alkali metal hydroxide and loweralkanols in which is dissolved an alkali metal loweralkoxide.

The ring-closure reaction is effected by combining compound IV–C and a cyclization solvent which is capable of extracting water from the molecular system. Suitable solvents have been found to be loweralkanoic anhydrides such as acetic anhydride and propionic anhydride; inorganic acids such as polyphosphoric acid, sulfuric acid; and the like. Temperatures of from room temperature to the reflux temperature of the cyclization agent are acceptable. The acetamido group may be maintained at the 2-position as a protected amine group and reactions performed on the group at the 6-position which might be interfered with if the free amine function was present. If the free amine is desired, compound IV–D is treated with a hydrolizing solution of an acid or base preferably, but not necessarily in aqueous solution. Preferable acids and bases are mineral acids such as hydrochloric or sulfuric, or alkali metal hydroxides such as sodium hydroxide or potassium hydroxide.

In Reaction Scheme IV, compound IV–D, when $R_5$ is nitro, there arises a reaction sequence wherein 2,6-di-(substituted aminocarbonyl or aminothiocarbonyl) compounds, in which the substituents thereon may be the same or different, may be formed, as shown in the following reaction scheme:

REACTION SCHEME V

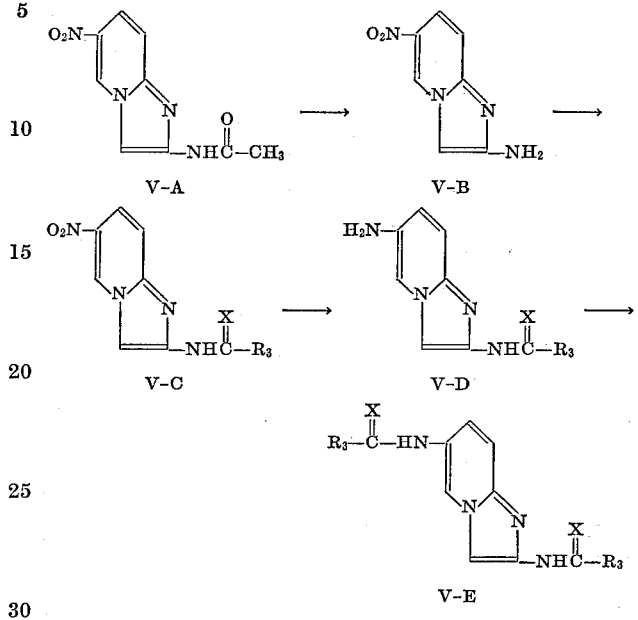

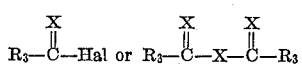

V–E wherein $R_3$ and X are as previously defined and the combination thereof at the 2-position need not be the same as the combination at the 6-position.

The hydrolysis of compound V–A will produce the amino group at the 2-position without affecting the nitro group at the 6-position. The hydrolysis is effected by treating compound V–A with an aqueous solution of an acid or base, preferably a mineral acid or an alkaline earth or alkali metal hydroxide. The hydrolysis is run at a temperature of from room temperature to the boiling point of the reaction medium which is usually slightly in excess of 100° C. The product is isolated by dilution of the reaction solution with water and extracting the resultant aqueous mixture with an organic, water immiscible solvent. The product is removed from solution in the organic solvent and purified by techniques known to those skilled in the art.

The conversion of the amino-nitro compound (V–B) obtained from the above hydrolysis to the substituted amino carbonyl or amino thiocarbonyl compound (V–C) is accomplished in a manner similar to that used in Reaction Schemes II, III or IV. The amino-nitro compound is contacted with a compound having one of the following formulae:

$$R_3-\overset{X}{\underset{\|}{C}}-Hal \ \text{or} \ R_3-\overset{X}{\underset{\|}{C}}-X-\overset{X}{\underset{\|}{C}}-R_3$$

wherein $R_3$, X and Hal are as defined previously, resulting in the formation of compound V–C.

The nitro group is reduced by those methods known to those skilled in the art such as noble metal catalytic hydrogenation using platinum, palladium, and the like; other active metal catalytic hydrogenation using Raney nickel and the like; and chemical hydrogenation using, for example, ammonium sulfide.

The amine at the 6-position is substituted in a manner identical to that used above. Further substitution at the 2-position nitrogen by displacing the remaining hydrogen cannot occur since that hydrogen atom has been rendered acidic by the first substitution on the nitrogen atom. The final product (compound V–E) has been synthesized such that there is a completely independent choice as to the groups substituted upon the 2- and 6-position amino groups. They may be the same or different, the choice of one having no effect upon the choice of the other.

As mentioned supra the above compounds are useful as anthelmintic and antifungal agents. The compounds of the instant invention show a high degree of anthelmentic activity against a broad spectrum of helminths. Among the genera against which the above compounds show activity are Haemonchus, Ostertagia, Trichostrongylus, Nematodirus, Chabertia, and Oesophogostomum.

Helminthiasis is a prevalent and serious disease which presents a large economic problem to the animal industry wherein every class of domestic animals is vulnerable to a large number of parasitic worm infections. In animals, the most serious helminthiases are caused by roundworms (Nematoda) and flukes (Trematoda). The results of parasitic infections caused by the above helminths are such symptoms as anemia, malnutrition, weakness, weight loss, severe damage to the walls of the intestinal tract and, if left untreated, death of the infected animal.

The imidazo[1,2-a] pyridines of this invention have unexpectedly high activity against these helminths. When they are used as anthelmintic agents they may be administered orally in a unit dosage form such as a capsule, bolus, tablet or as a liquid drench. The drench is normally an aqueous solution, suspension, or dispersion of the active ingredient together with a suspending agent such as bentonite, and a wetting agent or like excipient. Generally, the drenches also contain an antifoaming agent. The capsules and boluses comprise the active ingredient admixed with a carrier vehicle such as starch, talc, magnesium stearate or dicalcium phosphate. When the anthelmintic agent is to be administered via the animal feedstuff, it is intimately dispersed in the feed or used as a top dressing or in the form of pellets which are then added to the finished feed. Alternatively, the anthelmintics of this invention may be administered to animals by intraruminal, intramuscular and intratracheal injection in which event the imidazo[1,2-a]pyridine is dissolved or dispersed in a liquid carrier.

Although the anthelmintic agents of this invention find their primary use in the treatment and or prevention of helminthiasis in domesticated animals, such as sheep, cattle, horses, dogs, swine, and goats, they are also effective in treatment of helminthiasis of other animals. The optimum amount of active compound to be employed for best results will, of course, depend upon the particular imidazo[1,2-a]pyridine employed, the species of animal to be treated and the type and severity of the helminth infection. Generally, good results are obtained from our novel compounds by the oral administration of from about 1 to 125 mg./kg. of animal body weight, such total dose being given at one time or in divided doses over a relatively short period of time, such as 1–2 days. With the preferred compounds of this invention, excellent control of helminthiases is obtained in domesticated animals by administering from about 10 to 40 mg./kg. of body weight in a single dose. The techniques for administering these materials to animals are known to those skilled in the veterinary field.

The compounds of this invention have also proven useful as fungicidal agents. In tests, the compounds were shown to be active against fungi of the type *Aspergillus niger, Pullularia pullolans, Penicillium luteum, Chaetomium globosum, Trichoderma viride, Rhizoctania solani*, and the like. In in vitro tests the active compounds were active to the extent of 10 p.p.m. against *Pullularia pullulans, Chaetomium globosum* and *Rhizoctania solani*. Similar activity was observed against other fungi.

Fungi are important plant pathogens and several species are pathogenic for domestic animals and for man. As such, agents for their control are constantly being sought.

The compounds of this invention may be employed in the treatment of fungi in diverse formulations admixed in an inert carrier; solid, including finely divided powders and granular materials as well as liquid, such as solutions, emulsions, suspensions, concentrates, emulsifiable concentrates, slurries, and the like, depending upon the application intended and the formulation media desired. Thus, it will be appreciated that compounds of this invention may be employed to form fungicidally active compositions containing such compounds as essentially active ingredients thereof, which compositions may also include finely divided dry or liquid diluents, extenders, fillers, conditioners and excipients including various clays, diatomaceous earth, talc, and the like, or water and various organic liquids such as loweralkanols, for example ethanol, and isopropanol, or kerosene, benzene, toluene, and other petroleum distillate fractions or mixtures thereof. When the particular use of the compounds of this invention is desired to be the treatment and prevention of topical fungal growth, one or more of the compounds may be uniformly distributed in a vehicle that is chemically compatable with the particular compound selected, non-inhibiting with respect to the antifungal agent and essentially noninjurious to the host's tissue under the conditions of use.

The antifungal compositions of this invention may contain the active compounds to the extent of from 0.1 to 10% concentration when the composition is in a form ready for use. The exact concentration will depend upon the particular fungus, the particular host, the extent of the fungal infection and whether the composition is used for therapeutic or prophylactic purposes, with the range of from 0.5 to 5% being generally useful. If the composition is in the form of a premix or a concentrate the concentration may range from 1 to 75%.

The following examples are added for the purpose of illustration and not by way of limitation.

REACTION SCHEME I.—EXAMPLE 1

4-acetylthiazole 190 g. of 4-cyanothiazole is dissolved in 1.3 l. of diethyl ether and added slowly with stirring to a solution of 303 g. of methyl magnesium iodide and 0.8 l. of diethyl ether. The rate of addition is adjusted to keep the reaction under moderate reflux without the application of external heat. When the addition is complete, the reaction mixture is refluxed for 2½ hours. The mixture is stirred at 0° C. for 15 minutes following the addition of 750 ml. of 6 N HCl. The two phase reaction mixture is then neutralized with 50% sodium hydroxide to pH 7. The layers are separated and the aqueous layer extracted with ether. The combined ether extracts are dried over magnesium sulfate and evaporated to dryness. Recrystallization of the residue from a mixture of ether and hexane affords 4-acetylthiazole, M.P. 59° to 60° C.

EXAMPLE 2

4-bromoacetylthiazole 69.5 g. of bromine is added to a refluxing solution of 55 g. of 4-acetylthiazole dissolved in 300 ml. of carbon tetrachloride over a period of 1 hour. Upon the completion of the addition the precipitated solid is allowed to settle and the organic solvent decanted. The solid is stirred with a mixture of ice and water and the resultant aqueous mixture extracted with ether. The ether extracts are dried and evaporated to dryness affording 4-bromoacetylthiazole, M.P. 41 to 44° C.

EXAMPLE 3

2-(4-thiazolyl)-imidazo[1,2-a]pyridine 71 g. of 4-bromoacetylthiazole is dissolved in 200 ml. of acetone and added to a solution of 31.5 g. of 2-aminopyridine in 100 ml. of acetone. Upon stirring for 1½ hours at room temperature the precipitated solid is filtered and dissolved in water. The resultant solution is basified to a pH of 9 with 50% sodium hydroxide solution. The product is extracted with methylene chloride which affords 2 - (4 - thiazolyl)-imidazo[1,2-a]pyridine upon evaporation of the solvent to dryness. Recrystallization from ethyl acetate affords pure product, M.P. 169° to 170° C.

When in the above procedure p-bromoacetylbiphenyl, 4-bromoacetylpyridine or o-methoxybromoacetylbenzene is employed in place of 4-bromoacetylthiazole there is obtained: 2-(p-biphenylyl)-imidazo[1,2-a]pyridine, M.P. 219° to 220° C.; 4-(4-pyridyl)-imidazo[1,2-a]pyridine, M.P. 168° C.; and 2-(o-methoxyphenyl)-imidazo[1,2-a]pyridine, M.P. 224° to 225° C. (obtained as the hydrochloride salt), respectively.

EXAMPLE 4

2-carbamoylimidazo[1,2-a]pyridine 15 g. of 2-ethoxycarbonylimidazo[1,2-a]pyridine, the preparation of which is well known to those skilled in the art, is added to a mixture of 150 ml. of liquid ammonia and 150 ml. of methanol. The temperature is slowly raised to 100° C. in a closed system and maintained at that point for eight hours. The solvent is evaporated and the residue crystallized from water affording 2-carbamoylimidazo[1,2-a]pyridine, which melts at 222° to 223° C. and requires no further purification.

EXAMPLE 5

2-cyanoimidazo[1,2-a]pyridine 6 g. of 2-carbamoylimidazo[1,2-a]pyridine and 30 ml. of phosphorous oxychloride are combined and heated to reflux for 30 minutes. The excess phosphorous oxychloride is evaporated in vacuo and the product is obtained by careful treatment of the residue with ice water followed by recrystallization of the solid material thus produced from methanol. The pure 2-cyanoimidazo[1,2-a]pyridine has a M.P. of 174 to 175° C.

EXAMPLE 6

2-thiacarbamoylimidazo[1,2-a]pyridine 4 g. of 2-cyanoimidazo[1,2-a]pyridine is dissolved in a mixture of 25 ml. of pyridine, 4 ml. of triethylamine and 10 ml. of dimethyl formamide. Hydrogen sulfide is added to the resultant mixture until saturation is achieved and the reaction mixture allowed to stand for 2 hours at room temperature. 25 ml. of water is added and the resultant precipitate filtered and recrystallized from methanol affording pure 2-thiocarbamoylimidazo[1,2-a]pyridine, M.P. 204° to 205° C.

EXAMPLE 7

2-(2-thiazolyl)-imidazo[1,2-a]pyridine

A solution of 3 g. of 2-thiacarbamoylimidazo[1,2-a]pyridine in 10 ml. of 40% aqueous chloroacetaldehyde in 50 ml. of ethanol is refluxed for three hours. The solvent is evaporated and the residue dissolved in water. The aqueous solution is made basic with gaseous ammonia. The precipitated product is filtered and recrystallized from ethyl acetate affording pure 2-(2-thiazolyl)-imidazo-[1,2-a]pyridine.

EXAMPLE 8

6-methyl-2-(4-thiazolyl)-imidazo[1,2-a]pyridine 2.3 g. of 4-bromoacetylthiazole dissolved in 100 ml. of ether is added to a solution of 1.08 g. of 2-amino-5-methyl pyridine in 50 ml. of ether. The reaction is stirred for 48 hours at room temperature and the precipitated solid is filtered and dissolved in water. The aqueous solution is made basic by the addition of an aqueous solution of potassium carbonate, and the liberated free base thus obtained, upon recrystallization from ethyl acetate, affords pure 6-methyl-2-(4-thiazolyl)imidazo[1,2-a]pyridine, M.P. 172° to 172.5° C.

EXAMPLE 9

6-nitro-2-(4-thiazolyl)-imidazo[1,2-a]pyridine

To a solution of 4.17 g. of 2-amino-5-nitro pyridine in 300 ml. of acetone is added 6.9 g. of 4-bromoacetylthiazole and 300 ml. of acetone. The reaction mixture is stirred at room temperature for 48 hours and evaporated to dryness in vacuo. To the residue is added an aqueous solution of potassium bicarbonate. The resultant solid material is filtered and crystallized from ethanol affording pure 6-nitro-2-(4-thiazolyl)-imidazo[1,2-a]pyridine, M.P. 279 to 280° C.

When in the above procedure phenacyl bromide is employed in place of 4-bromoacetylthiazole there is obtained 6-nitro-2-phenylimidazo[1,2-a]pyridine.

EXAMPLE 10

6-amino-2-(4-thiazolyl)-imidazo[1,2-a]pyridine

A solution of 0.505 g. of 6-nitro-2-(4-thiazolyl)-imidazo[1,2-a]pyridine in 25 ml. of ethanol is reduced with hydrogen at 40 p.s.i. in the presence of 0.2 g. of 10% palladium on carbon. The hydrogenation proceeds until the theoretical uptake of hydrogen is achieved (4 hours). The reaction mixture is filtered and the solvent evaporated in vacuo. The residue is recrystallized from benzene affording pure 6-amino-2-(4-thiazolyl)-imidazo[1,2-a]pyridine, M.P. 212° to 216° C.

EXAMPLE 11

2-(3-oxothiazol-4-yl)-imidazo[1,2-a]pyridine 4 ml. of a 32% solution of hydrogen peroxide in water is added to 20 ml. of trifluoro acetic acid with stirring. Stirring is continued at room temperature for 10 minutes after which 5 g. of 2-(4-thiazolyl)-imidazo[1,2-a]pyridine is added and the resultant mixture heated slowly to 100° C. and maintained there for two hours. The reaction mixture is cooled and diluted with ice water. The resultant solution is made basic with ammonia and extracted with methylene chloride. The methylene chloride extracts are evaporated to dryness in vacuo and the residue recrystallized from ethanol affording pure 2-(3-oxothiazol-4-yl) imidazo[1,2-a]pyridine, M.P. 203.5° to 204.5° C.

When in the above procedure 2-(2-thiazolyl)-imidazo-[1,2-a]pyridine, 6-methoxycarbonylamino-2-(4-thiazolyl) imidazo[1,2-a]pyridine, or 6-ethoxycarbonylamino-2-(4-thiazolyl)-imidazo[1,2-a]pyridine is employed in place of 2-(4-thiazolyl)-imidazo[1,2-a]pyridine, there is obtained 2-(3-oxothiazol-2-yl)-imidazo[1,2-a]pyridine, 6-methoxycarbonylamino-2-(3-oxothiazol-4-yl)imidazo[1,2-a]pyridine (M.P. 340 to 345° C.) and 6-ethoxycarbonylamino-2-(3-oxothiazol-4-yl)-imidazo[1,2-a]pyridine (M.P. 247 to 250° C.), respectively.

REACTION SCHEME II.—EXAMPLE 12

2-benzamidoimidazo[1,2-a]pyridine

To a solution of 3 g. of 2-aminoimidazo[1,2-a]pyridine in 25 ml. of pyridine at 0° C. is added 3.15 g. of benzoyl chloride slowly with stirring. The reaction mixture is allowed to come to room temperature and stirred at room temperature for five hours. Upon the addition of water a solid precipitates which, after filtration and recrystallization from methanol, affords pure 2-benzamidoimidazo 1, 2-a]pyridine, M.P. 177 to 178° C.

EXAMPLE 13

3-methoxycarbonylaminoimidazo[1,2-a]pyridine 2.3 g. of methylchloroformate is added slowly with stirring to a solution of 3 g. of 2-aminoimidazo[1,2-a]pyridine at 0° C. The reaction mixture is allowed to come to room temperature and stirred at room temperature for 5½ hours. The product is precipitated by the addition of water and extracted with methylene chloride. The methylene chloride extracts are dried and evaporated in vacuo.

The residue is recrystallized from ethyl acetate affording pure 2-methoxycarbonylaminoimidazo[1,2-a]pyridine, M.P. 240 to 241° C.

REACTION SCHEME III.—EXAMPLE 14

6-methoxycarbonylamino-2-(4 thiazolyl)imidazo-[1,2-a]pyridine 190 mg. of methylchloroformate is added slowly with stirring to a solution of 400 mg. of 6-amido-2-(4-thiazolyl)imidazo[1,2-a]pyridine in 6 ml. of pyridine. The reaction is stirred at room temperature for 1½ hours after which ice water is added and the resultant mixture extracted with methylene chloride. The methylene chloride extracts are dried and evaporated in vacuo and the residue recrystallized from ethyl acetate. The pure 6-methoxycarbonylamino-2-(4-thiazolyl)imidazo[1,2-a]pyridine has a M.P. of 250 to 252° C.

When in the above procedure ethylchloroformate, isopropylchloroformate or benzoylchloride is employed in place of methylchloroformate there is obtained 6-ethoxycarbonylamino - 2 - (4 - thiazolyl)imidazo[1,2-a]pyridine (M.P. 207 to 209° C.), 6-isopropoxycarbonylamino-2-(4-thiazolyl)imidazo[1,2-a]pyridine (M.P. 215 to 216° C.), and 6 - benzamido-2-(4-thiazolyl)imidazo[1,2-a]pyridine (M.P. 231 to 232° C.), respectively.

REACTION SCHEME IV.—EXAMPLE 15

2-(p-aminobenzenesulfonamido)-1-carbamoylmethyl-1,2-dihydro-5-methylpyridine 10 g. of chloroacetamide is added to a solution of 26.3 g. of 2-(p-aminobenzenesulfonamido)-5-methylpyridine in 100 ml. of 1 N sodium hydroxide. The mixture is heated for 2 hours at 100° C. after which the reaction mixture is cooled and the product spontaneously crystallizes. The 2-(p-aminobenzenesulfonamido) - 1 - carbamoylmethyl-1,2-dihydro-5-methylpyridine is filtered and used without further purification.

EXAMPLE 16

2-acetamido-6-methylimidazo[1,2-a]pyridine 5 g. of 2-(p-aminobenzenesulfonamido)-1-carbamoylmethyl-1,2-dihydro-5-methylpyridine is dissolved in 15 ml. of acetic anhydride and refluxed for one hour. The solvent is evaporated in vacuo and the residue is dissolved in a minimum amount of ethanol and made basic with 25% sodium hydroxide solution with cooling. The 2-acetamido-6-methylimidazo[1,2-a]pyridine immediately crystallizes out and is suitable for use in the next step without further purification.

EXAMPLE 17

2-amino-6-methylimidazo[1,2-a]pyridine 1 g. of 2-acetamido-6-methylimidazo[1,2-a]pyridine and 10 ml. of 25% sodium hydroxide solution are combined and heated at 100° C. for 5 minutes. The solution is diluted with 40 ml. of ice water and extracted with methylene chloride. Evaporation of the methylene chloride extracts in vacuo affords crude 2-amino-6-methylimidazo-[1,2-a]pyridine which may be recrystallized from ethanol.

EXAMPLE 18

2-methoxycarbonylamino-6-methylimidazo-[1,2-a]pyridine 2.3 g. of methylchloroformate is added to a solution of 3 g. of 2-amino-6-methylimidazo[1,2-a]pyridine and 25 ml. of pyridine with stirring. The reaction mixture is stirred for 5 hours at room temperature following which 200 ml. of ice water is added. The resultant mixture is extracted with methylene chloride and the methylene chloride extracts are dried and evaporated in vacuo. The residue is recrystallized from ethyl acetate affording pure 2-methoxycarbonylamino-6-methylimidazo[1,2-a]pyridine.

REACTION SCHEME V.—EXAMPLE 19

2-(p-aminobenzylsulfonamido)-1-carbamoylmethyl-1,2-dihydro-5-nitropyridine 10 g. of chloroacetamide and 29.4 g. of 2-p-aminobenzylsulfonamido-5-nitropyridine are dissolved in 100 ml. of 1 N sodium hydroxide and heated for 1 hour at 100° C. Upon cooling 2-(p-aminobenzylsulfonamido)-1-carbamoylmethyl-1,2-dihydro-5-nitropyridine spontaneously crystallizes and is suitable for use in the next step without further purification.

EXAMPLE 20

2-acetamido-6-nitroimidazo[1,2-a]pyridine 5 g. of 2-(p-aminobenzylsulfonamido)-1-carbamoylmethyl-1,2-dihydro-5-nitropyridine is dissolved in 25 ml. of acetic anhydride and heated to reflux for 1 hour. The solvent is evaporated to dryness in vacuo and the residue is dissolved in ethanol and the resultant solution made basic with 25% sodium hydroxide. The product is collected by filtration and is recrystallized from ethyl acetate.

EXAMPLE 21

2-amino-6-nitroimidazo[1,2-a]pyridine 1 g. of 2-acetamido-6-nitroimidazo[1,2-a]pyridine and 10 ml. of 25% sodium hydroxide solution are combined and heated at 100° C. for 5 minutes. The reaction mixture is diluted with 40 ml. of ice water and the resultant mixture extracted with methylene chloride. The methylene chloride extracts are evaporated to dryness in vacuo and the residue is recrystallized from acetone affording pure 2-amino-6-nitroimidazo[1,2-a]pyridine.

EXAMPLE 22

2-ethoxycarbonylamino-6-nitroimidazo-[1,2-a]pyridine 1.5 g. of ethylchloroformate is added to a solution of 2 g. of 2-amino-6-nitroimidazo[1,2-a]pyridine in 25 ml. of pyridine. The reaction is stirred for 5 hours at room temperature and diluted with 200 ml. of ice water. The resultant solution is extracted with methylene chloride extracts and evaporated to dryness in vacuo. The residue is recrystallized from ethanol affording 2-ethoxycarbonylamino-6-nitroimidazo[1,2-a]pyridine.

EXAMPLE 23

2-ethoxycarbonylamino-6-aminoimidazo[1,2-a]pyridine 3 g. of ethoxycarbonylamino-6-nitroimidazo[1,2-a]pyridine is dissolved in 200 ml. of ethanol and reduced with hydrogen at room temperature at 40 p.s.i. in the presence of 0.5 g. of 5% palladium on carbon. The hydrogenation proceeds until the theoretical amount of hydrogen is absorbed. The catalyst is removed by filtration, the ethanol evaporated to dryness and the residue recrystallized from ethyl acetate affording pure 2-ethoxycarbonylamino-6-aminoimidazo[1,2-a]pyridine.

EXAMPLE 24

2-ethoxycarbonylamino-6-isopropoxycarbonyl-aminoimidazo[1,2-a]pyridine 0.8 g. of isopropylchloroformate is added to a well stirred solution of 1 g. of 2-ethoxycarbonylamino-6-aminoimidazo[1,2-a]pyridine in 10 ml. of pyridine. The reaction mixture is stirred for 5 hours at room temperature and diluted with 100 ml. of ice water. Following extraction of the resultant mixture the methylene chloride and evaporation of the methyl chloride extracts the residue is recrystallized from ethanol affording 2-ethoxycarbonylamino-6-isopropoxycarbonylaminoimidazo[1,2-a]pyridine.

What is claimed is:
1. A compound having the formula:

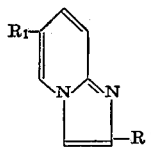

wherein R is a member selected from the group consisting of thiazolyl, 3-oxothiazol-4-yl, 3-oxothiazol-2-yl, thiadiazolyl and isothiazolyl; $R_1$ is a member selected from the group consisting of carbonylamino radicals of the formula:

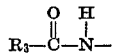

wherein $R_3$ is a member selected from the group consisting of loweralkyl, loweralkoxy and phenyl.

2. A compound as defined in claim 1 which is 6-ethoxycarbonylamino-2-(4-thiazolyl)imidazo[1,2-a]pyridine.

3. A compound as defined in claim 1 which is 6-ethoxycarboxylamino-2-(3 - oxothiazol-4-yl)imidazo[1,2-a]pyridine.

4. A compound as defined in claim 1 which is 6-methoxycarbonylamino-2-(4-thiazolyl) imidazo[1,2-a]pyridine.

5. A compound as defined in claim 1 which is 6-isopropoxycarbonylamino-2-(4 - thiazolyl) imidazo[1,2-a] pyridine.

References Cited

Godovikova et al., Chem. Abstracts, vol. 70, pp. 329, 87, 675 r, May 12, 1969.

ALAN L. ROTMAN, Primary Examiner

U.S. Cl. X.R.

260—250 R, 256.4 R, 294.9, 295.5 B; 424—250, 251, 266